(12) United States Patent
Kim et al.

(10) Patent No.: US 9,633,413 B2
(45) Date of Patent: Apr. 25, 2017

(54) SHAPE-CHANGEABLE DISPLAY DEVICE AND METHOD OF DRIVING THE SAME

(71) Applicant: Samsung Display Co., Ltd., Yongin, Gyeonggi-Do (KR)

(72) Inventors: Sang-Ho Kim, Gwangmyeong-si (KR); Jongsung Bae, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 86 days.

(21) Appl. No.: 14/602,607

(22) Filed: Jan. 22, 2015

(65) Prior Publication Data

US 2015/0221065 A1    Aug. 6, 2015

(30) Foreign Application Priority Data

Feb. 4, 2014    (KR) .................. 10-2014-0012730

(51) Int. Cl.

| | |
|---|---|
| *G06T 3/40* | (2006.01) |
| *G09G 3/20* | (2006.01) |
| *G06F 1/16* | (2006.01) |
| *G06F 3/00* | (2006.01) |
| *G06F 3/01* | (2006.01) |
| *G06F 3/03* | (2006.01) |

(52) U.S. Cl.
CPC .............. *G06T 3/40* (2013.01); *G06F 1/1616* (2013.01); *G06F 1/1641* (2013.01); *G06F 1/1647* (2013.01); *G06F 1/1677* (2013.01); *G06F 3/005* (2013.01); *G06F 3/011* (2013.01); *G06F 3/0304* (2013.01); *G09G 3/2092* (2013.01); *G06T 2215/16* (2013.01); *G09G 2380/02* (2013.01)

(58) Field of Classification Search
CPC ............ G09G 2354/00; G09G 2380/02; G06F 1/1652
USPC .......................................... 345/660
See application file for complete search history.

(56) References Cited

U.S. PATENT DOCUMENTS

| | | | |
|---|---|---|---|
| 2008/0055931 A1* | 3/2008 | Verstraete | G02B 6/0068 362/612 |
| 2012/0092363 A1* | 4/2012 | Kim | G06T 5/006 345/618 |
| 2012/0235893 A1 | 9/2012 | Phillips et al. | |
| 2012/0249622 A1 | 10/2012 | Yoshida et al. | |

(Continued)

FOREIGN PATENT DOCUMENTS

| | | |
|---|---|---|
| EP | 2500898 A1 | 9/2012 |
| KR | 1020100082451 A | 7/2010 |

(Continued)

*Primary Examiner* — Thomas Lett
(74) *Attorney, Agent, or Firm* — Cantor Colburn LLP

(57) ABSTRACT

A display device includes a display unit which displays an image in a bent state and including a plurality of display surfaces divided from each other by a bending position thereof, a bend-measuring unit including a sensor which measures a bending value of the display unit, a viewpoint-monitoring unit including a sensor which measures a viewing position of a viewer, where the viewing point-monitoring unit outputs position information based on the viewing position of the viewer, a control unit which compensates image data to be displayed on each of the display surfaces, based on the bending value and the position information, and a driving unit which drives the display unit using the compensated image data.

18 Claims, 22 Drawing Sheets

(56) References Cited

U.S. PATENT DOCUMENTS

| | | | | |
|---|---|---|---|---|
| 2013/0155052 A1* | 6/2013 | Ko | .................... | H04N 13/0022 |
| | | | | 345/419 |
| 2013/0207946 A1* | 8/2013 | Kim | .................... | G09G 3/3225 |
| | | | | 345/204 |
| 2013/0222276 A1* | 8/2013 | Kim | .................... | G06F 3/0488 |
| | | | | 345/173 |
| 2013/0342669 A1* | 12/2013 | Hsu | ................. | H04N 7/002 |
| | | | | 348/77 |
| 2014/0055429 A1* | 2/2014 | Kwon | .................... | G09G 3/001 |
| | | | | 345/204 |

FOREIGN PATENT DOCUMENTS

| KR | 1020130081458 A | 7/2013 |
|---|---|---|
| KR | 1020130091196 A | 8/2013 |

\* cited by examiner

θ1 < θ2

$\theta 1 < \theta r, \theta 2 < \theta r$ $\theta 1 < \theta r, \quad \theta 2 > \theta r$ $\theta1 > \theta r, \quad \theta2 < \theta r$ θ1 > θr, θ2 > θr

θ5 > 180°

SHAPE-CHANGEABLE DISPLAY DEVICE AND METHOD OF DRIVING THE SAME

This application claims priority to Korean Patent Application No. 10-2014-0012730, filed on Feb. 4, 2014, and all the benefits accruing therefrom under 35 U.S.C. §119, the contents of which in their entireties are herein incorporated by reference.

BACKGROUND

1. Field

Exemplary embodiments of the invention relate to a display device and a method of driving the display device, and in particular, to a shape-changeable display device and a method of driving the shape-changeable display device.

2. Description of the Related Art

A display panel is widely used for electronic devices with image-displaying function, such as smartphones, digital cameras, laptop computers, navigation systems and television sets, for example.

Various types of flat display panel, such as a liquid crystal display panel, an organic light emitting display panel, a plasma display panel and an electrophoresis display panel, for example, are being widely used as the display panel of an electronic device by virtue of thin and lightweight properties thereof.

Recently, foldable or flexible display devices are being studied. Due to features thereof such as thin, lightweight and unbroken properties, for example, the foldable and flexible display devices may be used for various industry fields, including information technology ("IT"), clothing, and paper-like media industries.

SUMMARY

Exemplary embodiments of the invention provide a display device configured to compensate image distortion, which may occur when the display device is deformed, and thereby to have improved display quality.

Other exemplary embodiments of the invention provide a method of driving the display device.

According to exemplary embodiments of the invention, a display device includes a display unit which displays an image in a bent state and including a plurality of display surfaces divided from each other by a bending position thereof, a bend-measuring unit including a sensor which measures a bending value of the display unit, a viewpoint-monitoring unit including a sensor which measures a viewing position of a viewer, where the viewpoint-monitoring unit outputs position information based on the measured viewing position of the viewer, a control unit which compensates image data to be displayed on each of the display surfaces, based on the bending value and the position information, and a driving unit which drives the display unit using the compensated image data.

According to other exemplary embodiments of the invention, a method of driving a display device includes measuring a bending value of a display unit of the display device, where the display unit displays an image in a bent state and comprising a plurality of display surfaces divided from each other by a bending position thereof, measuring a viewing position of a viewer to obtain position information based on the viewing position, compensating image data to be displayed on each of the display surfaces, based on the bending value and the position information, and driving the display unit using the compensated image data.

BRIEF DESCRIPTION OF THE DRAWINGS

The above and other feature of the invention will become apparent by describing in further detail exemplary embodiments thereof with reference to the accompanying drawings, in which.

DETAILED DESCRIPTION

Figure 1:
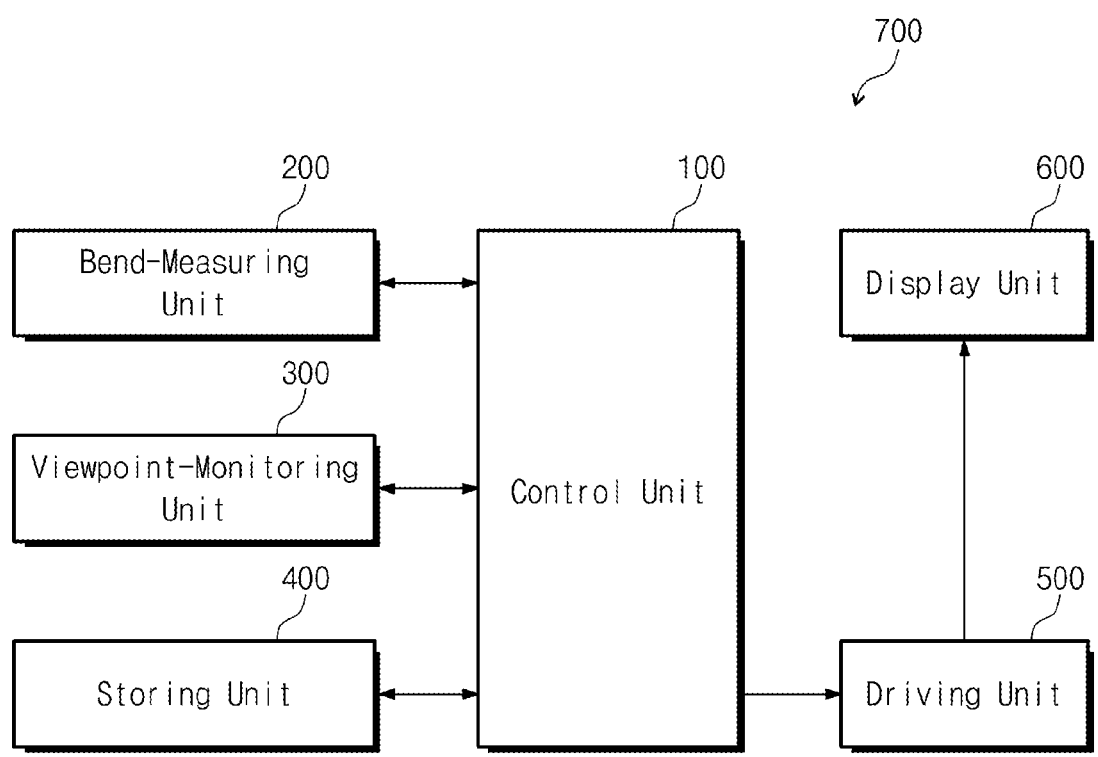
FIG. 1 is a block diagram schematically illustrating an exemplary embodiment of a display device according to the invention.

The inventions will now be described more fully hereinafter with reference to the accompanying drawings, in which various exemplary embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on," "connected" or "coupled" to another element, it can be directly connected or coupled to the other element or intervening elements may be present. In contrast, when an element is referred to as being "directly on," "directly connected" or "directly coupled" to another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region,"

"layer" or "section" discussed below could be termed a second element, component, region, layer or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms, including "at least one," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which exemplary embodiments of the inventions belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in further detail with reference to the accompanying drawings.

FIG. 1 is a block diagram schematically illustrating an exemplary embodiment of a display device according to the invention.

Referring to FIG. 1, an exemplary embodiment of a display device 700 according to the invention may include a control unit 100, a bend-measuring unit 200, a viewpoint-monitoring unit 300, a storing unit 400, a driving unit 500 and a display unit 600.

The display unit 600 may be configured to display information on an operation state, figures, letters, characters, moving images, still images, and so forth. In an exemplary embodiment, the display unit 600 may include a foldable display unit, which is configured to be folded along a folding line, or a flexible display unit including a flexible material (e.g., plastic) and thereby being bendable like paper or a plastic film.

In an exemplary embodiment, the display unit 600 may be configured to display images in a bent state and include at least two display surfaces that are divided from each other by a bending position. In an exemplary embodiment, where the display unit 600 is the foldable display unit, the display unit 600 may include N display surfaces, where N is an integer of 2 or greater.

According to exemplary embodiments of the invention, the display unit 600 may be configured in such a way that images therefrom may be seen to be similar to an image (i.e., a flat image) displayed on an un-folded display unit, even when the display unit 600 is in a partially-folded or curved state. In such an embodiment, the display device 700 may include the bend-measuring unit 200, the viewpoint-monitoring unit 300 and the storing unit 400, as described above, and the control unit 100 may be configured to compensate image data, which will be provided to the display unit 600, based on information provided from the bend-measuring unit 200, the viewpoint-monitoring unit 300 and the storing unit 400.

The bend-measuring unit 200 may include a bending-measurement sensor that measures deformation in shape of the display unit 600. In an exemplary embodiment, the bending-measurement sensor may be a gyro sensor or a strain sensor, for example. For convenience of description, an exemplary embodiment in which the gyro sensor is used as the bending-measurement sensor will hereinafter be described in detail.

In such an embodiment, the bend-measuring unit 200 may measure a bending value of the display unit 600 using the gyro sensor.

The viewpoint-monitoring unit 300 may include a position-monitoring sensor that is configured to measure a viewing position of a viewer of the display unit 600. In one exemplary embodiment, for example, an optical sensor or a motion-detecting sensor may be used as the position-monitoring sensor.

In an exemplary embodiment, the control unit 100 may calculate a folding angle between two adjacent display surfaces from the bending value provided from the bend-measuring unit 200. In such an embodiment, the control unit 100 may execute a calculation operation for obtaining a viewing angle between respective display surfaces and the viewing position of the viewer, based on the position information of the viewer measured by the position-monitoring sensor.

In an exemplary embodiment, the control unit 100 may compensate original image data to be provided to the display surfaces based on the folding angle and the viewing angle. In an exemplary embodiment, the control unit 100 may refer to the storing unit 400, in which a compensation table is stored, for such a process of image compensation. In an exemplary embodiment, the compensation table may include compensation values (e.g., weights for a scaling process) corresponding to the folding and viewing angles.

The image data compensated by the control unit 100 may be transferred to the driving unit 500. In an exemplary embodiment, the driving unit 500 may generate data voltages for driving the display unit 600, based on the transferred image data, and then, be provided to the display unit 600.

As described above, in an exemplary embodiment, image data distorted by the bending of the display device may be compensated based on the folding and viewing angles, and thus, the viewer may be allow to perceive the compensated images to be similar to a flat image, within a pre-set range such that display quality and visibility of the display device 700 may be substantially improved.

Figure 2A:
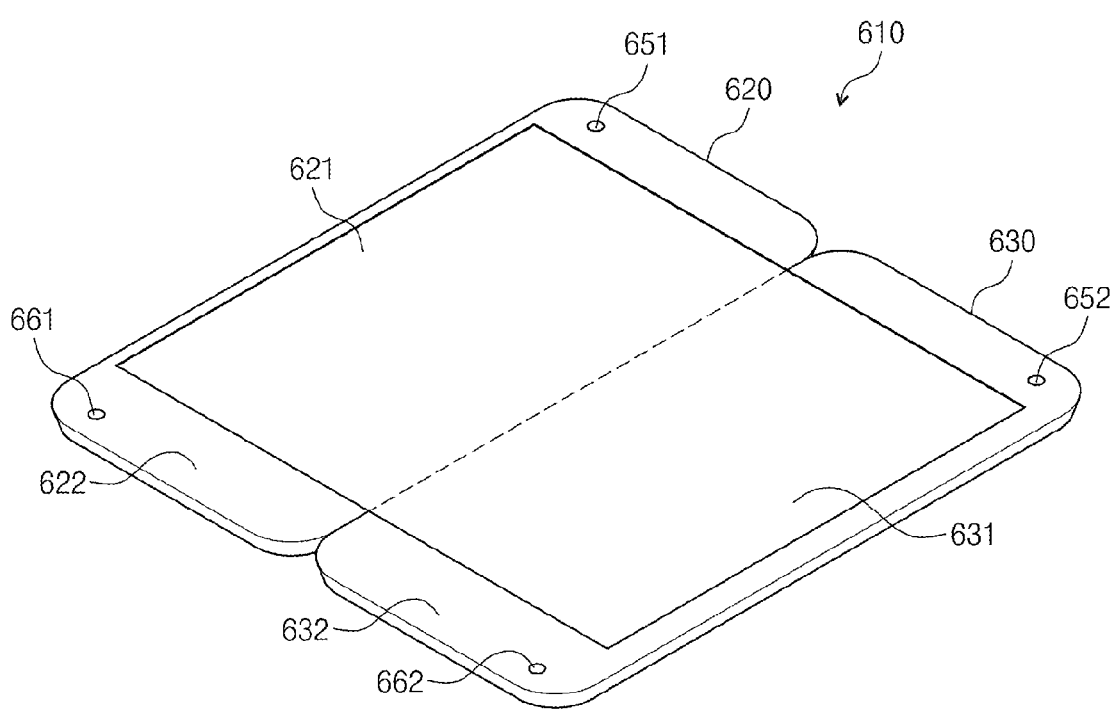
FIG. 2A is a perspective view illustrating an exemplary embodiment of a foldable display unit in an un-folded state.
Figure 2B:
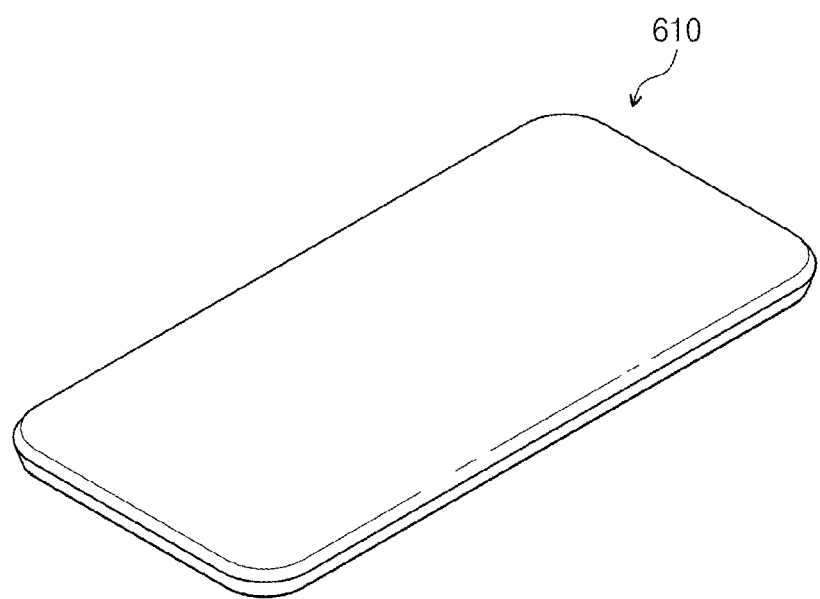
FIG. 2B is a perspective view illustrating an exemplary embodiment of a foldable display unit in a folded state.

FIG. 2A is a perspective view illustrating an exemplary embodiment of a foldable display unit in an un-folded state, and FIG. 2B is a perspective view illustrating an exemplary embodiment of a foldable display unit in a folded state.

Referring to FIGS. 2A and 2B, an exemplary embodiment of the display unit 600 may include a foldable display unit 610. The foldable display unit 610 may include a first display unit 620 with a first display surface 621 and a second display unit 630 with a second display surface 631.

As shown in FIG. 2A, when the foldable display unit 610 is in an un-folded state, a folding angle between the first and second display surfaces 621 and 631 may be substantially 180°. When the foldable display unit 610 is in the un-folded state, the foldable display unit 610 may be operation in a double screen mode; for example, images may be displayed on the first and second display surfaces 621 and 631.

When the foldable display unit 610 is completely folded as shown in FIG. 2B or the folding angle between the first and second display surface 621 and 631 is smaller than a pre-set reference folding angle, the foldable display unit 610 may be turned off.

In exemplary embodiments, the foldable display unit 610 may be folded in such a way that the first and second display surfaces 621 and 631 face each other (i.e., in an in-folded manner) or opposite surfaces thereof face each other (i.e., in an out-folded manner).

The first display unit 620 may further include a first peripheral region 622 provided around the first display surface 621, and the second display unit 630 may further include a second peripheral region 632 provided around the second display surface 631.

A first gyro sensor 651 and a first position-monitoring sensor 661 may be provided in the first peripheral region 622, and a second gyro sensor 652 and a second position-monitoring sensor 662 may be provided in the second peripheral region 632.

In an exemplary embodiment, as shown in FIG. 2A, each of a single first gyro sensor 651 and a single second gyro sensor 652 may be provided in a corresponding one of the first and second peripheral region 622 and 632. In an alternative exemplary embodiment, a plurality of the first gyro sensors 651 and/or a plurality of the second gyro sensors 652 may be two-dimensionally arranged and spaced apart from each other on a corresponding one of the first and second display unit 620 and 630.

According to exemplary embodiments of the invention, as shown in FIG. 2A, each of a single first position-monitoring sensors 661 and a single second position-monitoring sensor 662 may be provided in a corresponding one of the first and second peripheral regions 622 and 632. In an alternative exemplary embodiment, a plurality of the first position-monitoring sensor 661 and/or a plurality of the second position-monitoring sensor 662 may be two-dimensionally arranged and spaced apart from each other on a corresponding one of the first and second display unit 620 and 630.

In an exemplary embodiment, the foldable display unit 610 may further include a jointing unit (not shown) that connects the first and second display units 620 and 630 to each other. The jointing unit may be configured to connect the first and second display units 620 and 630 to each other in a hinge-like manner.

Figure 3A:
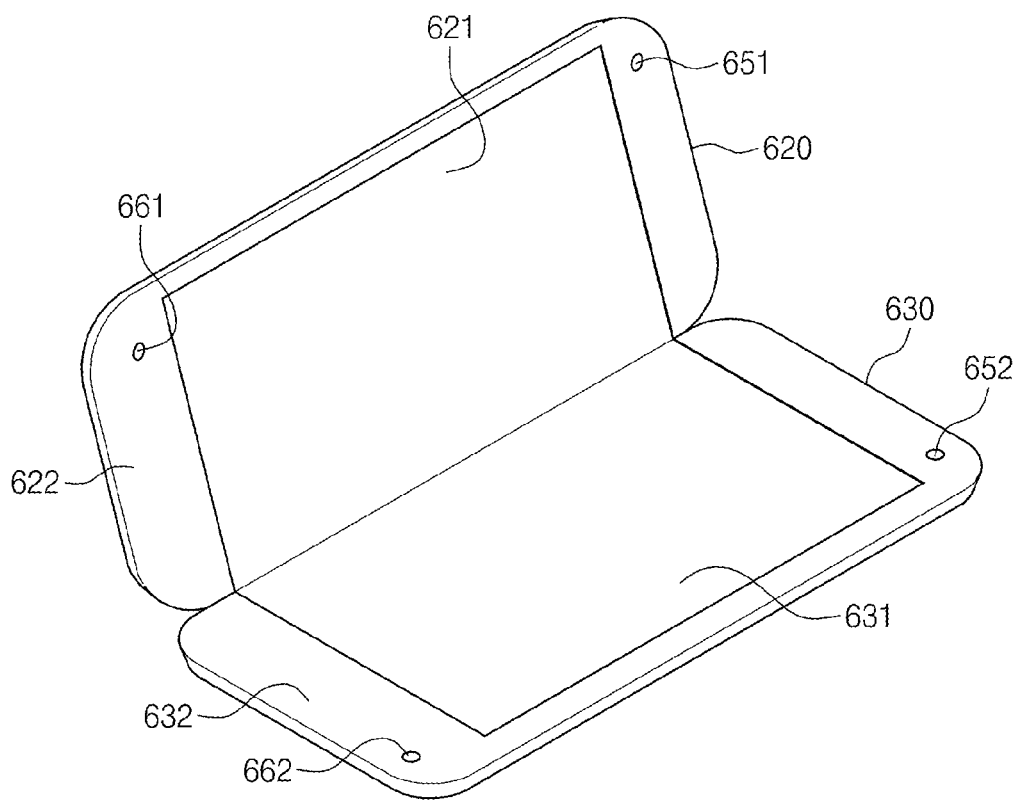
FIG. 3A is a perspective view illustrating an exemplary embodiment of a foldable display unit in a partially-folded state.
Figure 3B:
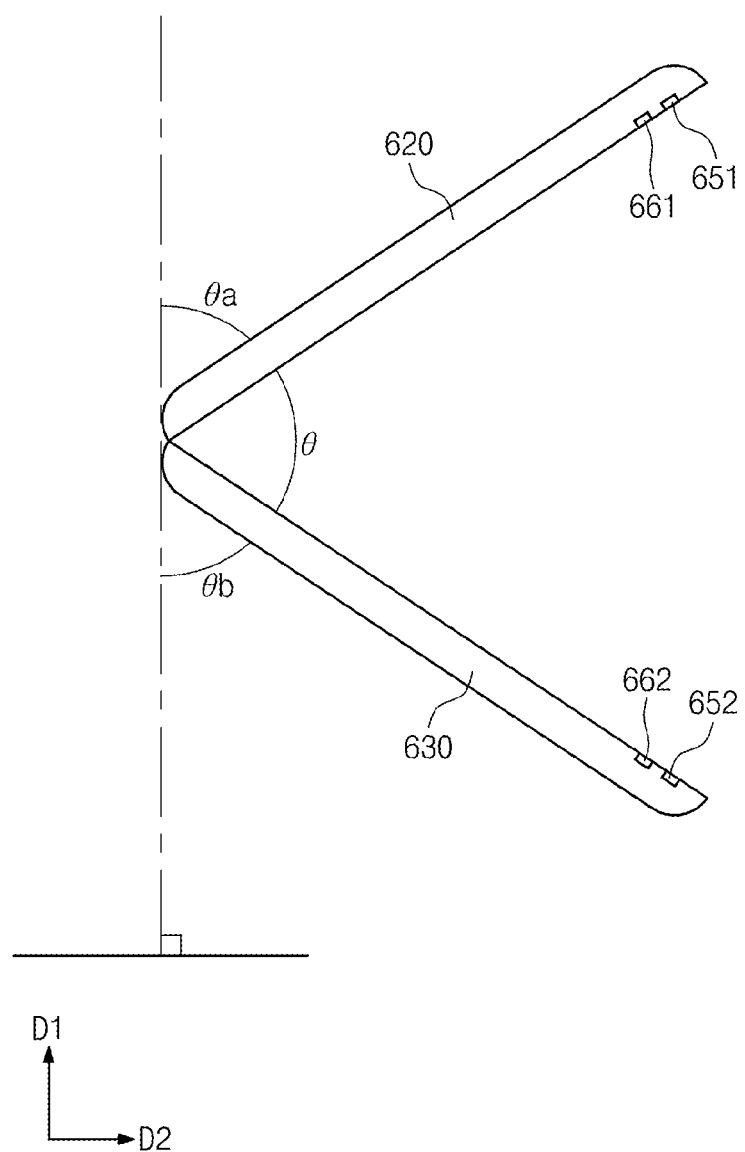
FIG. 3B is a side view illustrating an exemplary embodiment of a foldable display unit in a partially-folded state.

FIG. 3A is a perspective view illustrating an exemplary embodiment of a foldable display unit in a partially-folded state, and FIG. 3B is a side view illustrating an exemplary embodiment of a foldable display unit in a partially-folded state.

In an exemplary embodiment, as shown in FIGS. 3A and 3B, the first and second display units 620 and 630 may be folded based on an axis of a hinge in such a way that the first and second display surfaces 621 and 631 face each other.

Referring to FIG. 3B, a direction parallel to a gravity direction will be referred to as a first direction D1, and a direction substantially perpendicular to the first direction D1 will be referred to as a second direction D2.

In such an embodiment, when the first and second display units 620 and 630 are in an un-folded state, the first and second display units 620 and 630 may be substantially parallel to the gravity direction. In such an unfolded state, both of first and second bending angles $\theta a$ and $\theta b$ measured by the first and second gyro sensors 651 and 652, respectively, may be about 0°.

As shown in FIG. 3B, when the first and second display units 620 and 630 are partially folded in the in-folded manner, that is, in the partially-folded state, the first bending angle $\theta a$ between the first display unit 620 and the gravity direction may be a finite value greater than about 0°, and the second bending angle $\theta b$ between the second display unit 630 and the gravity direction may be a finite value greater than about 0°.

Here, a folding angle $\theta$ between the first and second display surfaces 621 and 631 may be given by the following equation: $\theta=180°-(\theta a+\theta b)$, where $\theta a$ and $\theta b$ denote the first and second bending angles, respectively.

As the folding angle $\theta$ decreases, deformation of images displayed on the foldable display unit 610 may become greater. In an exemplary embodiment, the control unit 100 may compensate image data, which will be provided to the display unit 600, based on the folding angle $\theta$. In one exemplary embodiment, for example, the control unit 100 may adjust a scale of an image displayed on each of the first and second display surfaces 621 and 631 based on the folding angle θ, and may perform the scale adjustment to allow the resulting image to be displayed with substantially the same size as a flat image, even when the foldable display unit 610 is partially folded.

Figure 4A:
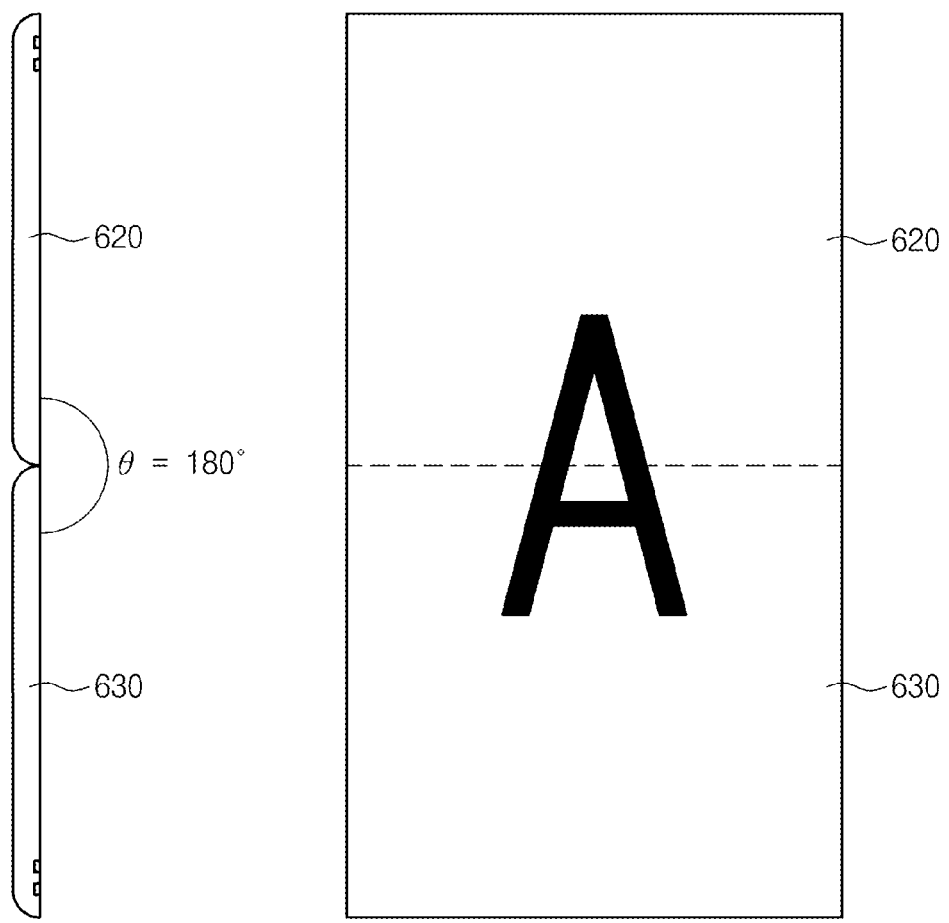
FIGS. 4A through 4C are schematic diagrams illustrating images displayed by an exemplary embodiment of a foldable display unit, based on a folding angle.
Figure 4B:
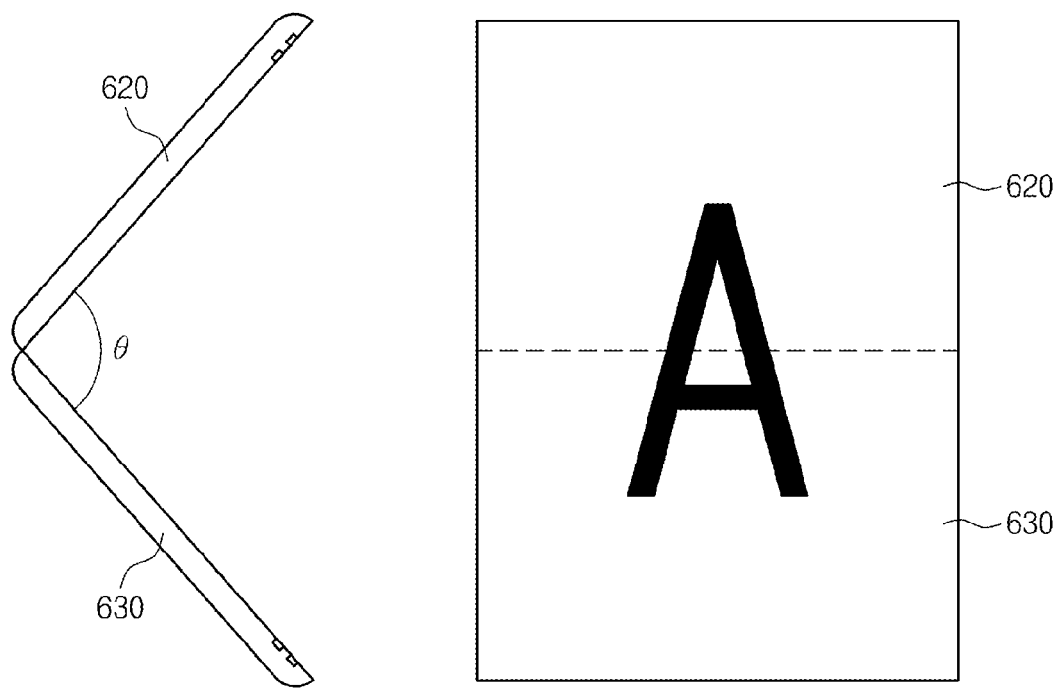
Figure 4C:
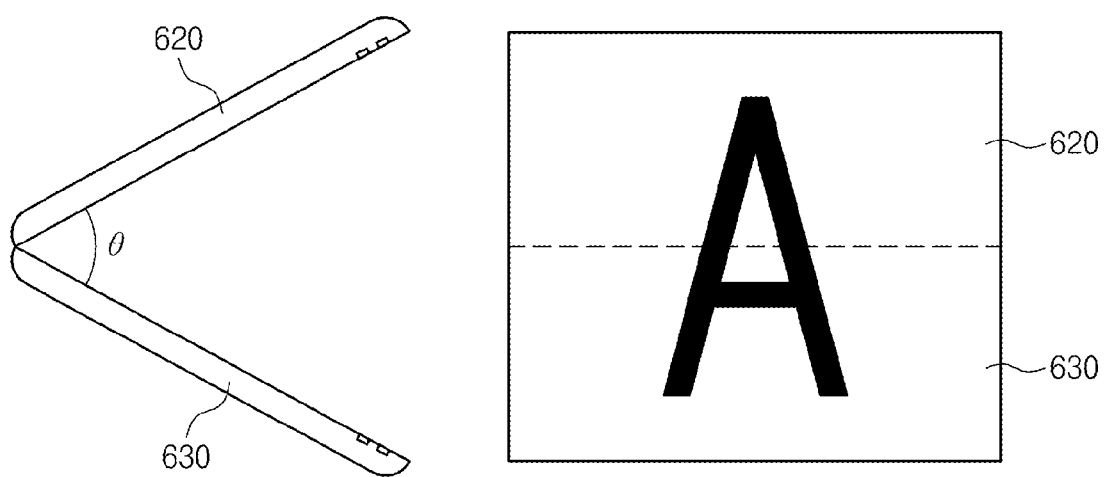

FIGS. 4A through 4C are schematic diagrams illustrating images displayed by an exemplary embodiment of a foldable display unit, based on a folding angle.

FIG. 4A shows an exemplary embodiment of the foldable display unit 610 that displays a letter 'A' with a first size at the folding angle θ of about 180°.

As shown in FIGS. 4B and 4C, even in the case that the folding angle θ becomes smaller than 180°, the letter 'A' displayed on the foldable display unit 610 may be controlled or scaled to be substantially the same size as the first size. This scaling may be achieved by compensating image data to be provided to the first and second display surface 621 and 631 based on the folding angles θ.

According to exemplary embodiments of the invention, deformation of the foldable display unit 610 may be monitored in real-time to adjust a scale of an image to be displayed on the first and second display surfaces 621 and 631, such that the image is effectively prevented from being distorted, thereby improving a display quality of the display device.

Figure 5A:
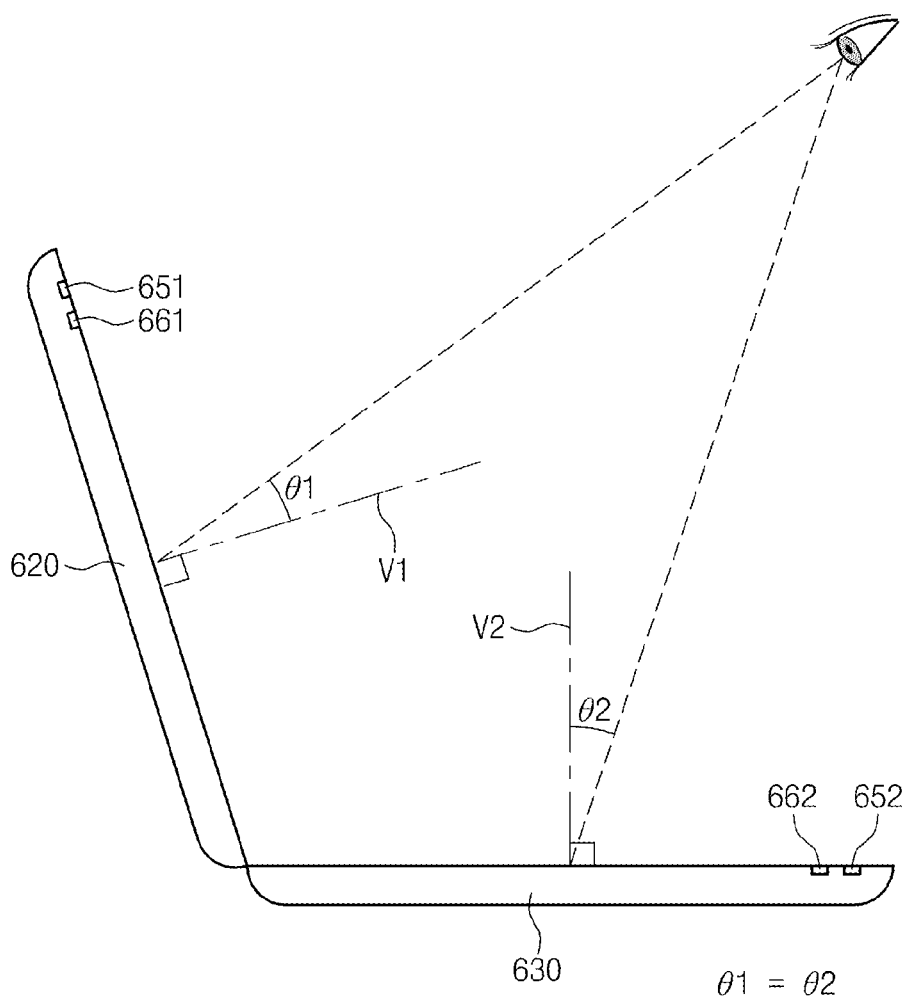
FIGS. 5A through 5C are schematic diagrams illustrating a change in viewing angles of two display surfaces of an exemplary embodiment of a foldable display, based on a viewing position of a viewer.
Figure 5B:
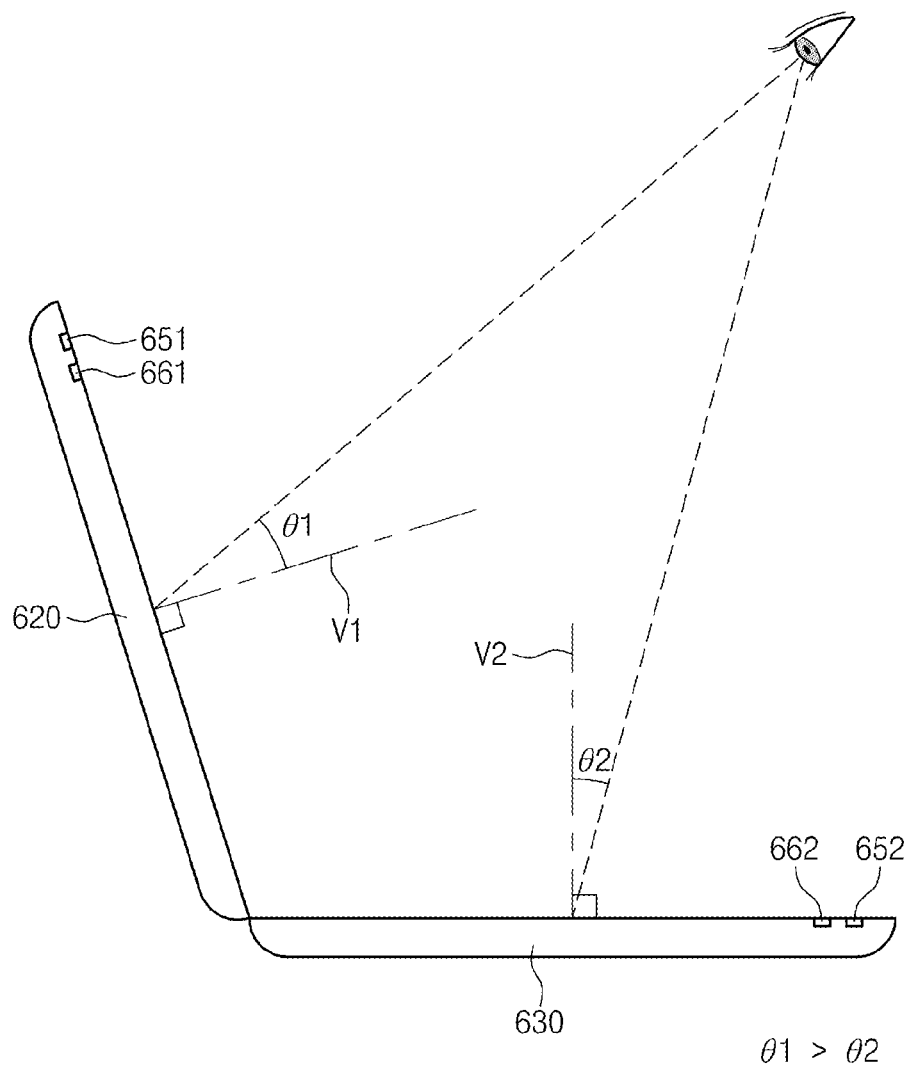
Figure 5C:
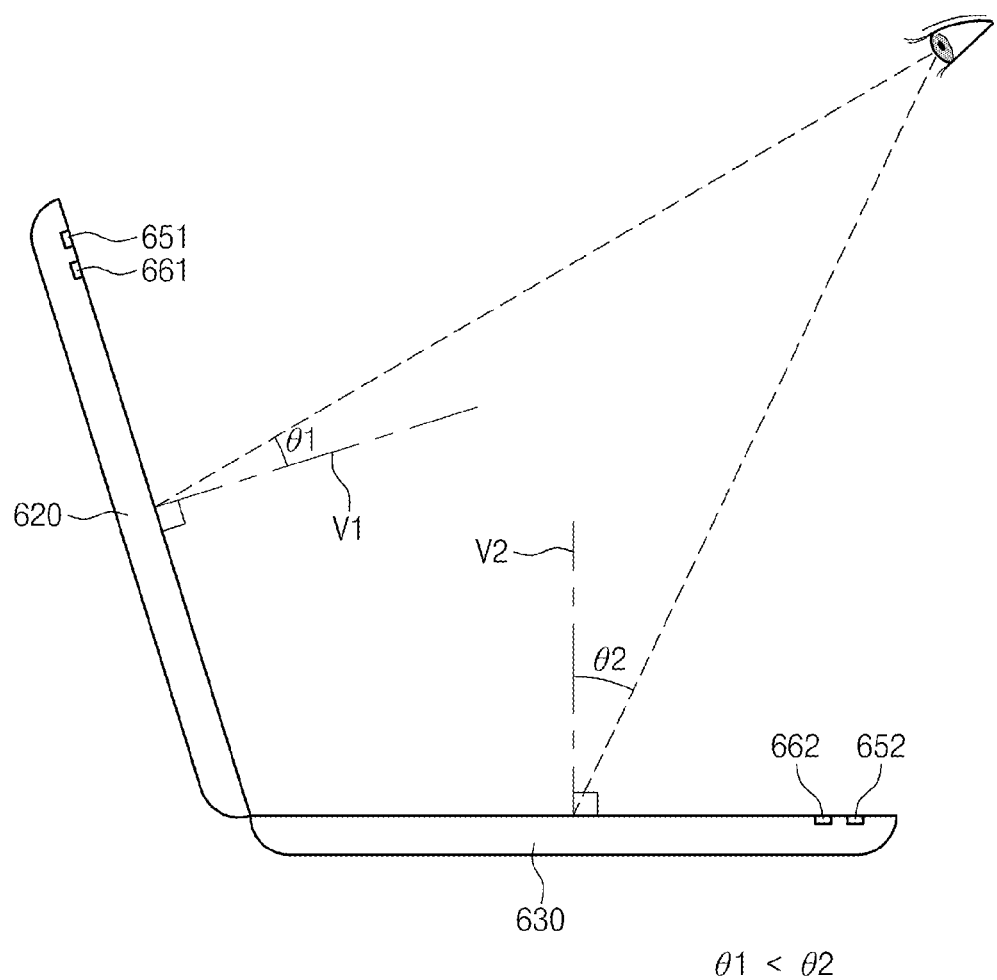

FIGS. 5A through 5C are schematic diagrams illustrating a change in viewing angles of two display surfaces of an exemplary embodiment of a foldable display, based on a viewing position of a viewer.

Referring to FIG. 5A, a line normal to the first display surface 621 will be referred to as a first virtual line V1, and a line normal to the second display surface 631 will be referred to a second virtual line V2.

A first position information sensor 661 may be provided in the first display unit 620 to track a position of the viewer, and a second position information sensor 662 may be provided in the second display unit 630 to track the position of the viewer. Information on the position of the viewer may be obtained by the first and second position information sensors 661 and 662 and then be transferred to the control unit 100.

The viewer position information may be transferred from the first and second position information sensors 661 and 662 to the control unit 100, and the bending information may be transferred from the first and second gyro sensors 651 and 652 to the control unit 100. Based on the viewer position information and the bending information, the control unit 100 may calculate the first and second viewing angles θ1 and θ2 from the first and second virtual lines V1 and V2, respectively, to the viewing position of the viewer.

As shown in FIG. 5A, the first and second viewing angles θ1 and θ2 may be substantially identical to each other. In an exemplary embodiment, when the first and second viewing angles θ1 and θ2 are substantially identical to each other, the compensation of the image data may be performed based on the first viewing angle θ1. In such an embodiment, when the first and second viewing angles θ1 and θ2 are substantially the same as each other, images to be displayed on the first and second display units 620 and 630 may be scaled up or down substantially in the same manner.

Referring to FIG. 5B, the second viewing angle θ2 may be less than the first viewing angle θ1. In an exemplary embodiment, when the second viewing angle θ2 is less than the first viewing angle θ1, the viewer may stare more directly at the second display unit 630 than at the first display unit 620. Accordingly, for the viewer, the image on the first display unit 620 appears to be more deformed than the image on the second display unit 630.

Accordingly, when the second viewing angle θ2 is less than the first viewing angle θ1, the compensation of the image data in the control unit 100 may be performed in such a way that the sizes of the images to be displayed on the display surfaces are adjusted with different scale factors.

When the second viewing angle θ2 is less than the first viewing angle θ1, the image on the first display unit 620 may be more distorted than the image on the second display unit 630. In this case, during the compensation of the image data, a scale of an image to be displayed on the second display unit 630 may be adjusted with a first weight, and a scale of an image to be displayed on the first display unit 620 may be adjusted with a second weight that is different from (e.g., greater than) the first weight.

Referring to FIG. 5C, when the first viewing angle θ1 is less than the second viewing angle θ2, the viewer may stare more directly at the first display unit 620 than at the second display unit 630. Accordingly, for the viewer, the image displayed on the second display unit 630 appears to be more deformed than the image on the first display unit 620.

Accordingly, when the first viewing angle θ1 is less than the second viewing angle θ2, the compensation in the control unit 100 may be performed to apply different scaling conditions to the image data, which will be displayed on the first and second display units 620 and 630, respectively.

When the second viewing angle θ2 is greater than the first viewing angle θ1, the image on the second display unit 630 may be more distorted than the image on the first display unit 620. In this case, during the compensation of the image data, a scale of the image on the second display unit 630 may be adjusted with a third weight, and a scale of the image on the first display unit 620 may be adjusted with a fourth weight that is different from (e.g., smaller than) the third weight.

In an exemplary embodiment, the first to fourth weights may vary depending on the folding angle θ. In one exemplary embodiment, for example, the first to fourth weights may be increased as the folding angle θ is decreased to enlarge the size of the image through the scaling.

Figure 6:
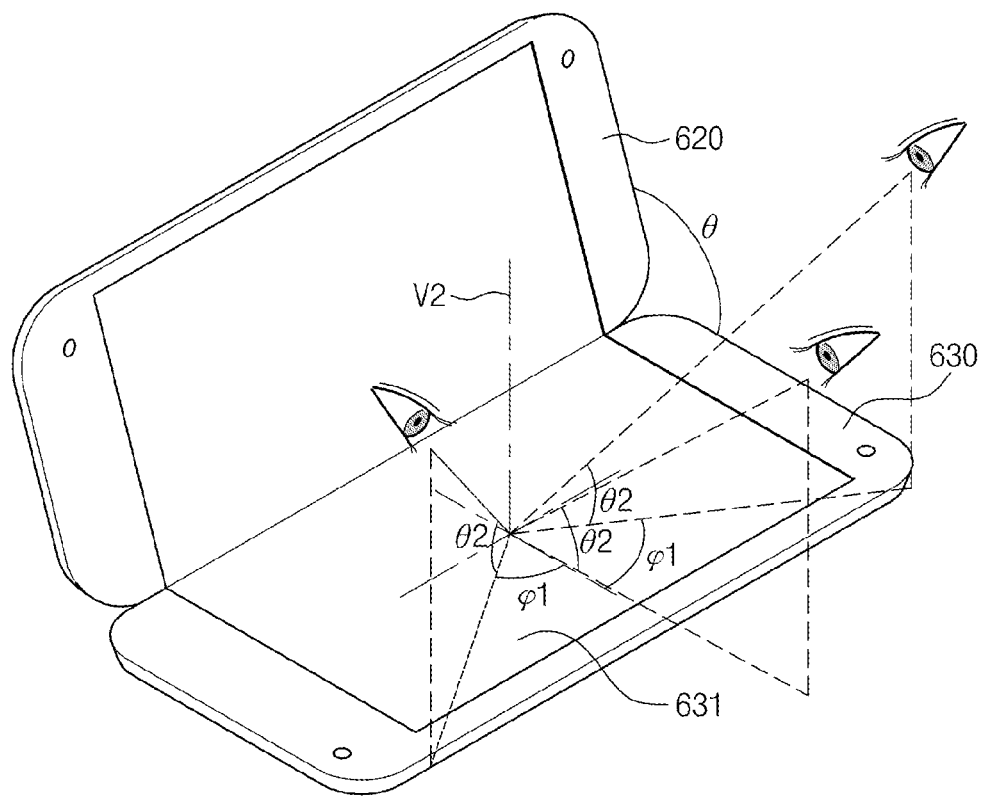
FIG. 6 is a diagram illustrating a viewing position of a viewer in a spherical coordinate system, where an origin of the viewing position is located on a second display unit.

FIG. 6 is a diagram illustrating a viewing position of the viewer in a spherical coordinate system, where the origin of the viewing position is located on the second display unit.

Referring to FIG. 6, when the second virtual line V2 normal to the second display surface 631 is parallel to a z-axis, an xy-plane may be defined as one of planes that are parallel to the second display surface 631.

The control unit 100 may calculate spherical coordinates of the viewing position of the viewer based on information transferred from the second position-monitoring sensor 662. In one exemplary embodiment, for example, in a first spherical coordinate system with an origin located on the second display unit 630, the control unit 100 may calculate a polar angle θ2 and an azimuth angle φ1 to specify a viewing direction of the viewer.

In such an embodiment, the control unit 100 may perform the compensation of the image data to be provided to the second display unit 630 based on the polar angle θ2 and the azimuth angle φ1, such that the image on the second display surface 631 is effectively prevented from being seen in a distorted manner by the viewer, even when the viewing position of the viewer is changed.

In such an embodiment, similar to the case of the second display unit 630, the image on the first display surface 621 may be compensated using information on the viewing position of the viewer, which may be given by polar and azimuth angles in another spherical coordinate system or a second spherical coordinate system, whose origin is located on the first display unit 620. In exemplary embodiments, the control unit 100 may execute calculation to obtain the polar and azimuth angles in the second spherical coordinate system from data, which have been measured by the first position-monitoring sensor 661. In such an embodiment, the control unit 100 may perform the compensation of the image data to be displayed on the first display unit 620 based on the polar and azimuth angles in the second spherical coordinate system.

According to exemplary embodiments, as shown in FIG. 6, the control unit 100 may be configured to compensate the image data, which will be displayed on the first and second display surfaces 621 and 631, based on not only the folding angle $\theta$ between the first and second display units 620 and 630 but also the viewing direction of the viewer (e.g., the first and second viewing angles $\theta 1$ and $\theta 2$). In one exemplary embodiment, for example, the control unit 100 may be configured to allow the viewer to perceive an image on the display device 700 as a flat image or one similar thereto, within a pre-set range. Accordingly, display quality and visibility of the display device 700 may be improved.

FIGS. 7A through 7D are diagrams illustrating an exemplary embodiment of a driving operation of a control unit, according to various viewing angles.

Figure 7A:
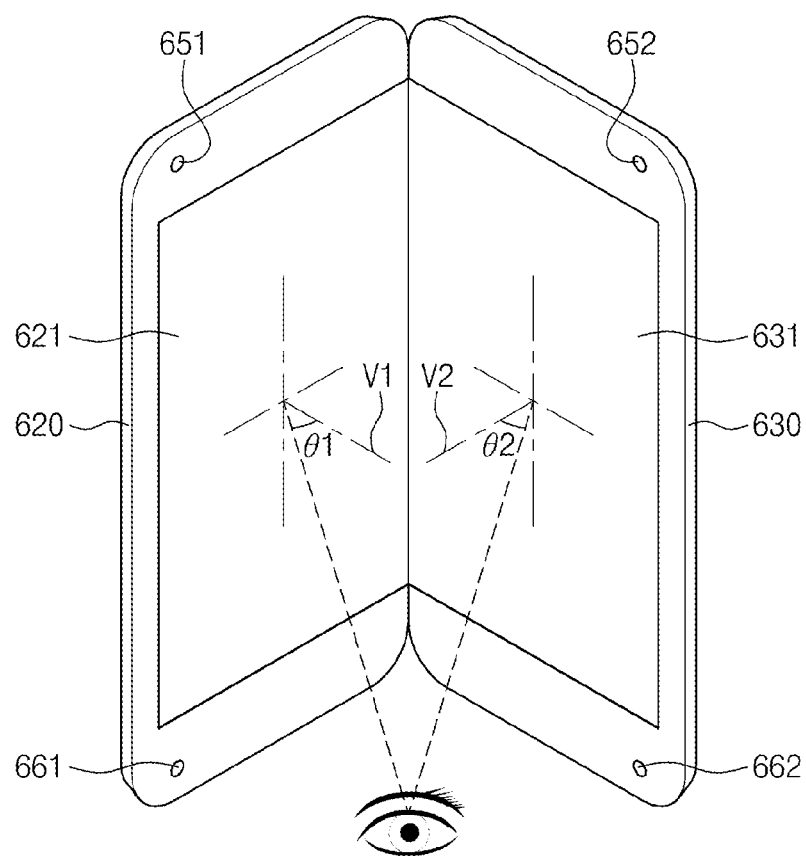
FIGS. 7A through 7D are diagrams illustrating an exemplary embodiment of a driving operation of a control unit according to various viewing angles.

Referring to FIG. 7A, in an exemplary embodiment, the control unit 100 may set a reference angle $\theta r$ to provide an angle range allowing the viewer to see an image without any distortion. The control unit 100 may calculate the first and second viewing angles $\theta 1$ and $\theta 2$ of the viewer, based on measurement data transferred from the first and second position-monitoring sensors 661 and 662. Here, the first and second viewing angles $\theta 1$ and $\theta 2$ may be angles from the first and second virtual lines V1 and V2, respectively, to the viewer.

In such an embodiment, the control unit 100 may compare the first and second viewing angles $\theta 1$ and $\theta 2$ with the reference angle $\theta r$. When both of the first and second viewing angles $\theta 1$ and $\theta 2$ are smaller than the reference angle $\theta r$, the control unit 100 may decide that the viewer is located at a position, allowing the viewer to view normally images on the first and second display units 620 and 630. In such an embodiment, the control unit 100 may perform an operation for compensating image data to be displayed on the first and second display units 620 and 630, based on the first and second viewing angles $\theta 1$ and $\theta 2$.

Figure 7B:
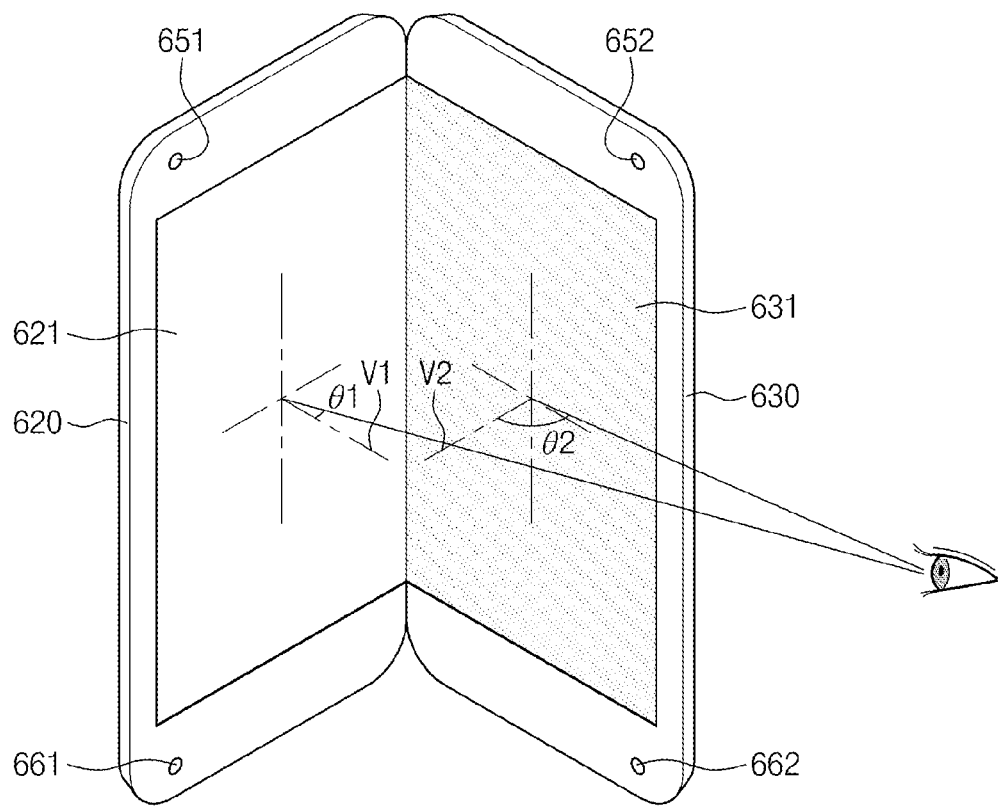

Referring to FIG. 7B, when the first viewing angle $\theta 1$ is smaller than the reference angle $\theta r$ and the second viewing angle $\theta 2$ is greater than the reference angle $\theta r$, the control unit 100 may decide that the viewer is located at a position, at which an image on the first display unit 620, but not the second display unit 630, can be seen by the viewer. In this case, the control unit 100 may turn off the second display unit 630 and turn on only the first display unit 620, and the control unit 100 may perform an operation for compensating image data to be displayed on the first display unit 620, based on the first viewing angle $\theta 1$.

Figure 7C:
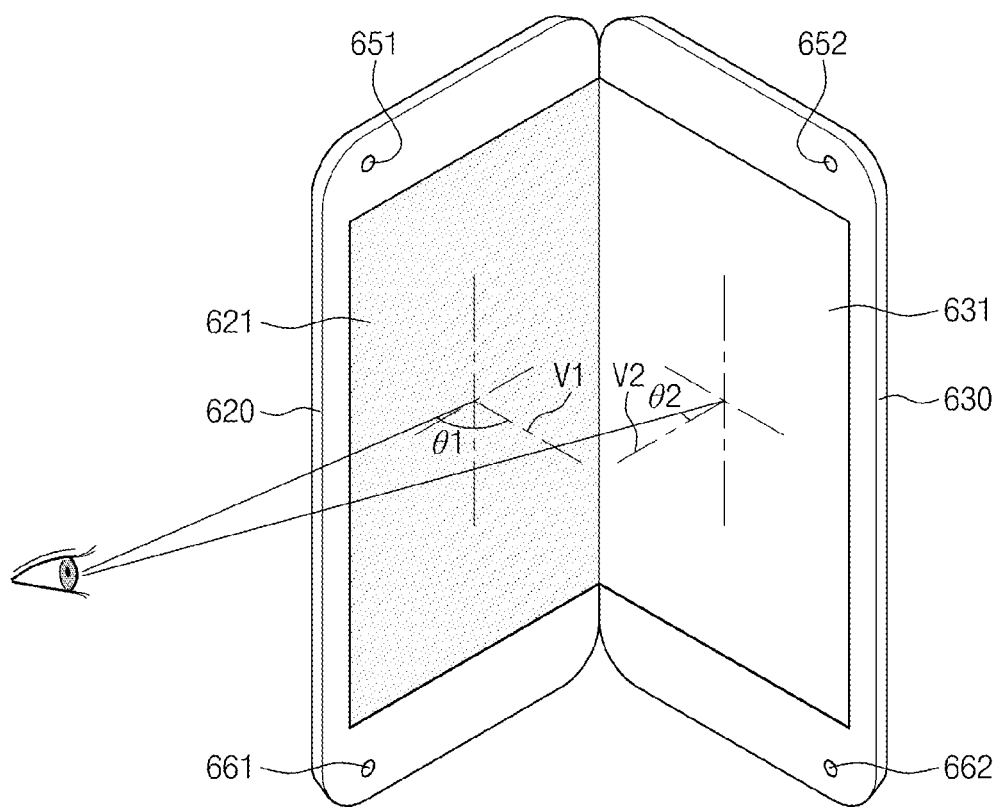

As shown in FIG. 7C, when the first viewing angle $\theta 1$ is greater than the reference angle $\theta r$ and the second viewing angle $\theta 2$ is smaller than the reference angle $\theta r$, the control unit 100 may decide that the viewer is located at a position, at which an image on the second display unit 630, but not the first display unit 620, can be seen by the viewer. In this case, the control unit 100 may turn off the first display unit 620 and turn on only the second display unit 630, and the control unit 100 may perform an operation for compensating image data to be displayed on the second display unit 630, based on the second viewing angle $\theta 2$.

Figure 7D:
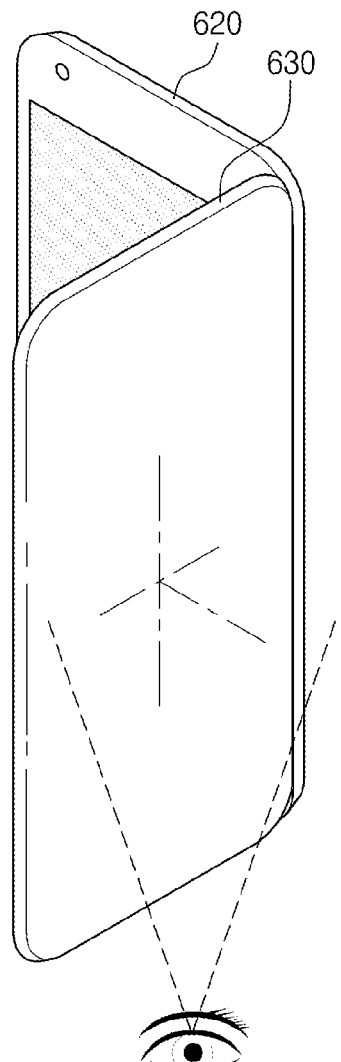

Referring to FIG. 7D, when both of the first and second viewing angles $\theta 1$ and $\theta 2$ are greater than the reference angle $\theta r$, the control unit 100 may decide that the viewer is located at a position, at which none of images on the first and second display units 620 and 630 can be seen by the viewer. In this case, the control unit 100 may turn off the first and second display units 620 and 630.

Figure 8A:
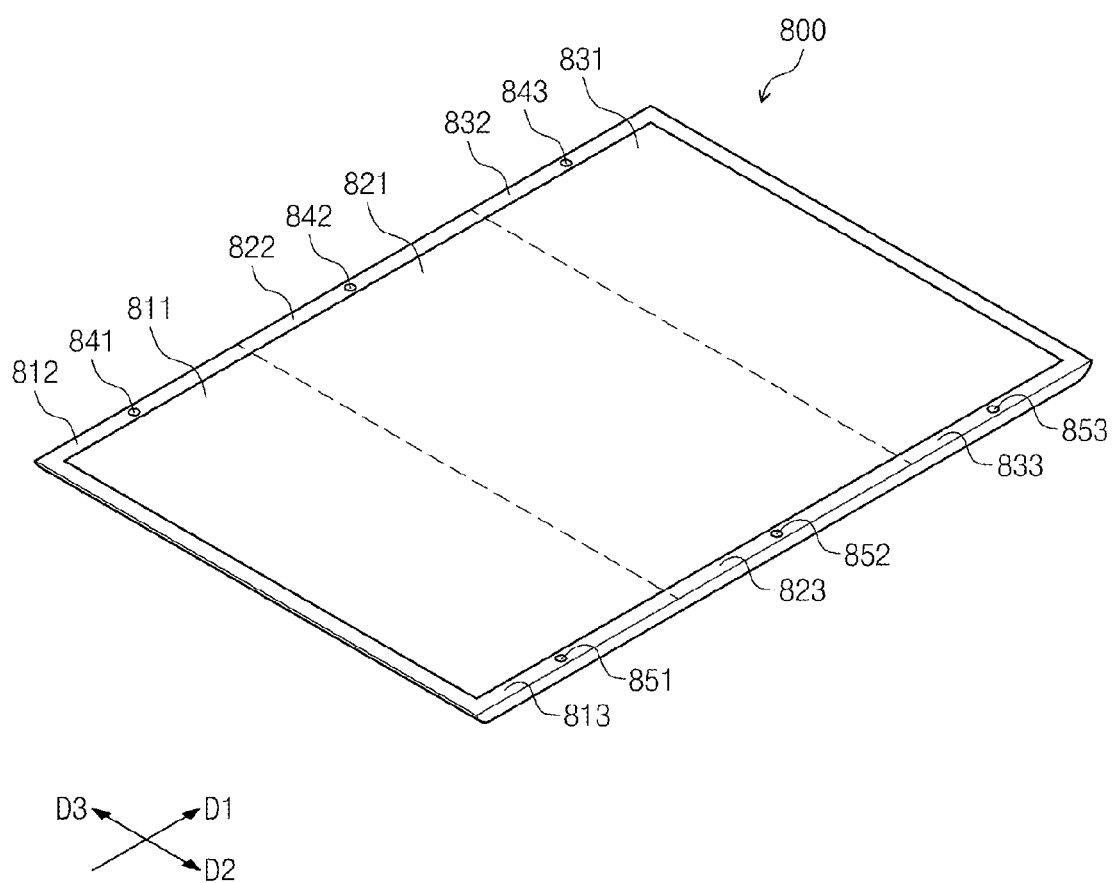
FIGS. 8A through 8C are perspective views illustrating an exemplary embodiment of a three-stage foldable display unit according to the invention.
Figure 8B:
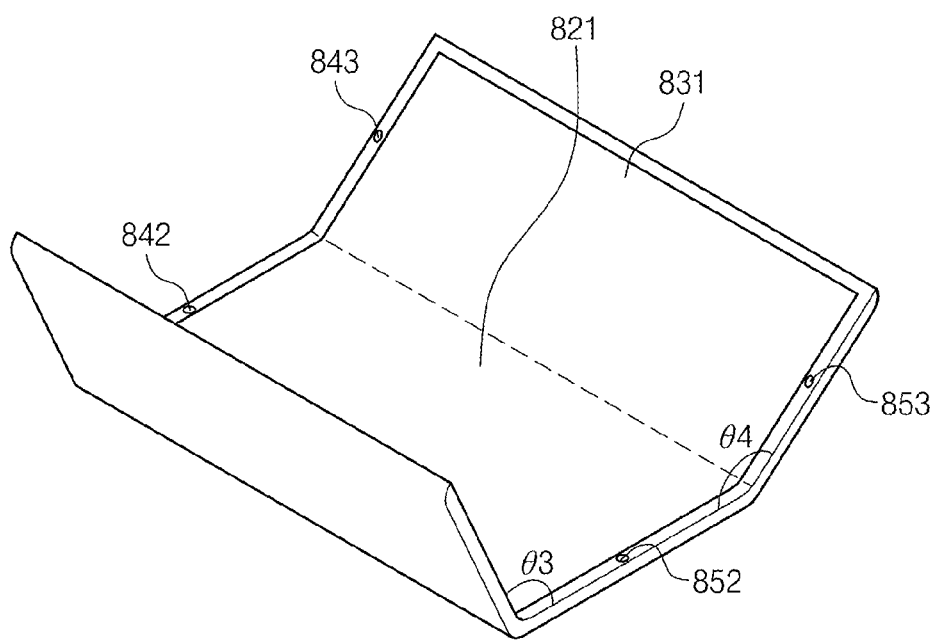
Figure 8C:
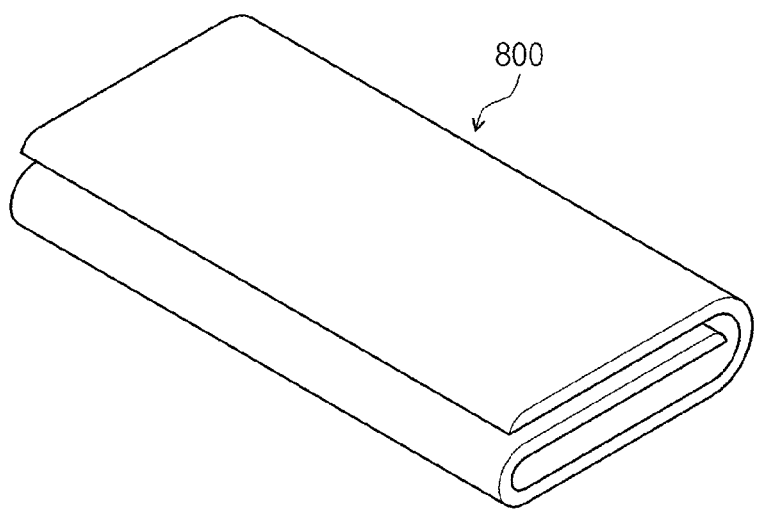

FIGS. 8A through 8C are perspective views illustrating an exemplary embodiment of a three-stage foldable display unit according to the invention.

Referring to FIG. 8A, an exemplary embodiment of a three-stage foldable display unit 800 may include first, second and third display surfaces 811, 821 and 831, which may be sequentially arranged in, for example, a first direction D1. In such an embodiment, a first gyro sensor 841 and a first position-monitoring sensor 851 may be provided at both side edges 812 and 813 of the first display surface 811 (for example, in second and third directions D2 and D3). In such an embodiment, a second gyro sensor 842 and a second position-monitoring sensor 852 may be provided at both side edges 822 and 823 of the second display surface 821, and a third gyro sensor 843 and a third position-monitoring sensor 853 may be provided at both side edges 832 and 833 of the third display surface 831.

However, the numbers and positions of the first to third gyro sensors 841, 842, and 843 and the first to third position-monitoring sensors 851, 852 and 853 in exemplary embodiments of the invention are not limited to those of the exemplary embodiment illustrated in FIG. 8A.

Referring to FIG. 8B, in an exemplary embodiment, the control unit 100 may calculate a first folding angle $\theta 3$ between the first display surface 811 and the second display surface 821 using measurement data obtained from the first and second gyro sensor 841 and 842. In such an embodiment, the control unit 100 may calculate a second folding angle $\theta 4$ between the second display surface 821 and the third display surface 831 using measurement data obtained from the second and third gyro sensor 842 and 843.

The control unit 100 may compare the first and second folding angles $\theta 3$ and $\theta 4$ with a pre-set reference folding angle. When the first and second folding angles $\theta 3$ and $\theta 4$ are smaller than the reference folding angle, all of the first to third display surfaces 811, 821 and 831 may be turned off. In one exemplary embodiment, for example, as shown in FIG. 8C, when the three-stage foldable display unit 800 is folded to form a three-folded structure, all of the first to third display surfaces 811, 821 and 831 may be turned off.

In such an embodiment, when the first folding angle $\theta 3$ between the first and second display surfaces 811 and 821 are smaller than the reference folding angle and the second folding angle $\theta 4$ is greater than the reference folding angle, the first and second display surfaces 811 and 821 may be turned off and the third display surface 831 may be turned on. In this case, the compensation of the image data may be performed based on measurement data obtained from the third position-monitoring sensor 853.

In such an embodiment, when the first folding angle $\theta 3$ between the first display surface 811 and the second display surface 821 is greater than the reference folding angle and the second folding angle $\theta 4$ is smaller than the reference folding angle, the second and third display surfaces 821 and 831 may be turned off and the first display surface 811 may be turned on. In this case, the compensation of the image data may be performed based on measurement data obtained from the first position-monitoring sensor 851.

When both of the first and second folding angles θ3 and θ4 are greater than the reference folding angle, the first to third display surfaces 811, 821 and 831 may be turned on. In this case, the compensation of the image data to be displayed on the first to third display surfaces 811, 821 and 831, respectively, may be performed based on measurement data obtained from the first to third position-monitoring sensors 851, 852 and 853.

In one exemplary embodiment, for example, the control unit 100 may calculate a first viewing angle (not shown) between the first display surface 811 and the viewer and may compensate image data to be provided to the first display surface 811, based on the first viewing angle. In such an embodiment, the control unit 100 may calculate second and third viewing angles (not shown) between the second and third display surfaces 821 and 831 and the viewer, and then, compensate image data to be provided to the second and third display surfaces 821 and 831, respectively, based on the second and third viewing angles.

Figure 9A:
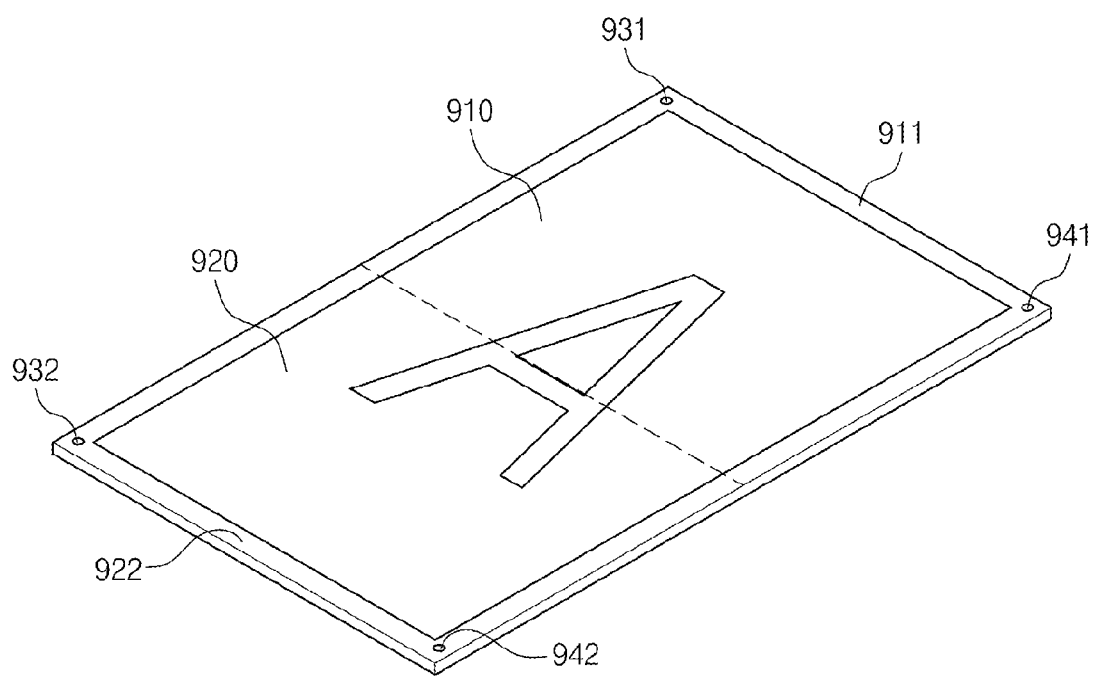
FIGS. 9A through 9C are perspective views illustrating an exemplary embodiment of a flexible display unit according to the invention.
Figure 9B:
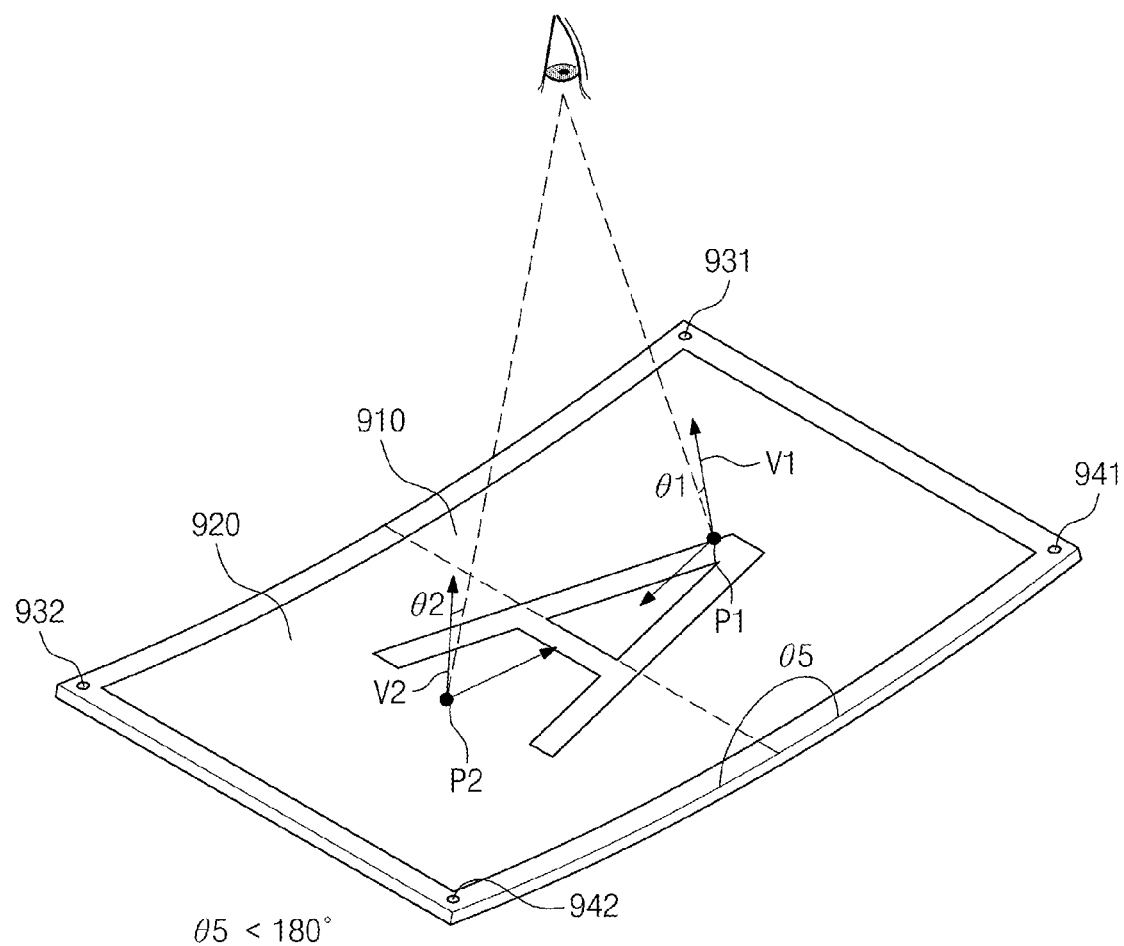
Figure 9C:
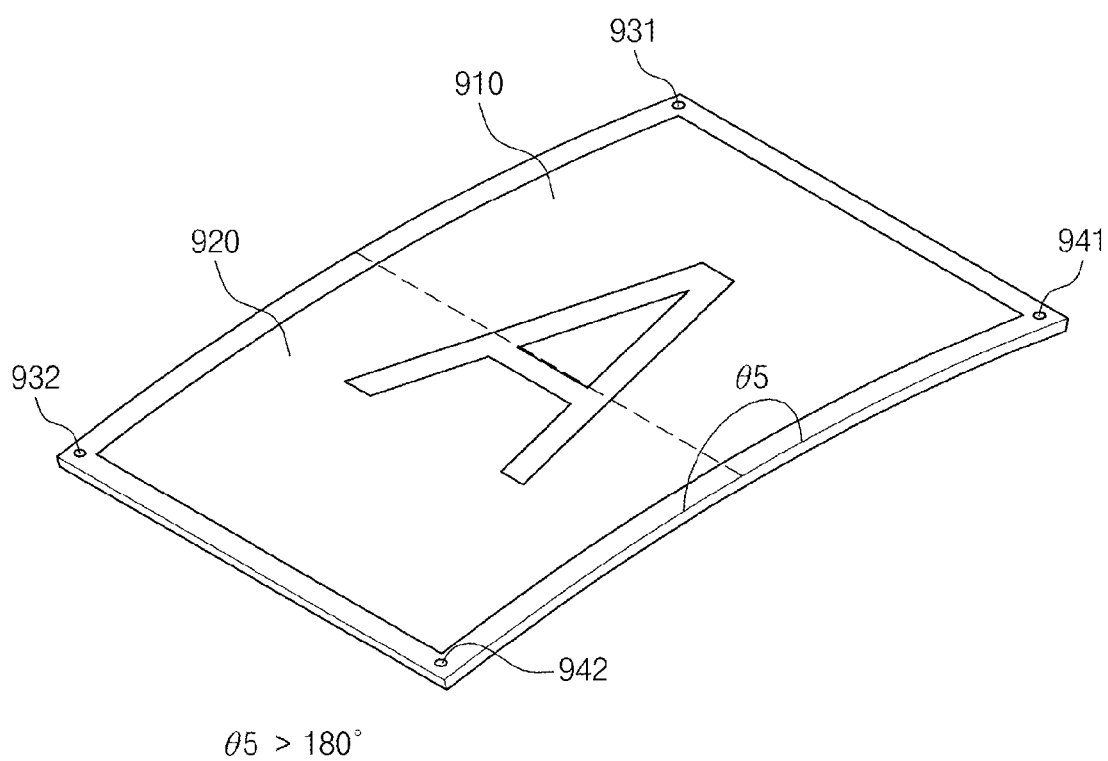

FIGS. 9A through 9C are perspective views illustrating an exemplary embodiment of a flexible display unit according to the invention.

Referring to FIG. 9A, in an exemplary embodiment, a flexible display unit may be divided into first and second display surfaces 910 and 920, which are defined based on a reference line. The first and second display surface 910 and 920 may be connected to each other on the reference line, thereby forming a single continuous screen. A peripheral region may be provided around the first and second display surfaces 910 and 920, and first and second gyro sensors 931 and 932 and first and second position-monitoring sensors 941 and 942 may be provided on the peripheral region. In one exemplary embodiment, for example, the first gyro sensor 931 and the first position-monitoring sensor 941 may be disposed on a first peripheral region 911 positioned around the first display surface 910, and the second gyro sensor 932 and the second position-monitoring sensor 942 may be disposed on a second peripheral region 922 positioned around the second display surface 920.

However, the numbers and positions of the gyro and position-monitoring sensors in exemplary embodiments of the invention are not limited to those of the exemplary embodiment illustrated in FIG. 9A.

Referring to FIG. 9B, the control unit 100 may calculate a folding angle θ between the first and second display surfaces 910 and 920 using measurement data obtained from the first and second gyro sensors 931 and 932.

When the folding angle θ5 is smaller than 180°, the control unit 100 may decide that the first and second display surfaces 910 and 920 are folded to face each other (i.e., in an in-folded state).

In such an embodiment, as shown in FIG. 9C, when the folding angle θ5 is greater than 180°, the control unit 100 may decide that the first and second display surfaces 910 and 920 are folded in such a way that opposite surfaces thereof face each other (i.e., in an out-folded state).

The storing unit 400 (e.g., shown in FIG. 1) may further include a compensation table, in which weights for the in-folded state and weights for the out-folded state are separately stored.

For the viewer, the flat image may be seen to be shrunk in the in-folded state of the flexible display unit and to be enlarged in the out-folded state. In exemplary embodiments, the control unit may perform a scaling or image-data-compensation operation for enlarging the image in the in-folded state and for contracting the image in the out-folded state.

Referring back to FIGS. 9B and 9C, first and second positions P1 and P2 may represent center points of the first and second display surfaces 910 and 920, respectively, and first and second virtual lines V1 and V2 may represent lines that are normal to the tangential surfaces of the first and second positions P1 and P2, respectively.

When the flexible display unit is in the in-folded state, the control unit 100 may calculate first and second viewing angles θ1 and θ2 between the viewer and the first and second virtual lines V1 and V2, based on measurement data obtained from the first and second position-monitoring sensors 941 and 942.

In such an embodiment, the control unit 100 may perform an operation of compensating image data to be displayed on each of the first and second display surfaces 910 and 920, based on the first and second viewing angles θ1 and θ2. Such a compensating operation may be performed in a similar manner to that of the exemplary embodiments described above with reference to FIGS. 1 through 8C, and any repetitive detailed description thereof will be omitted.

According to exemplary embodiments of the invention, the image data distorted by the bending of the display device may be compensated based on the folding and viewing angles, and thus, the viewer is allowed to perceive the compensated images to be similar to a flat image, within a pre-set range, such that display quality and visibility of the display device are substantially improved.

While only some exemplary embodiments of the invention have been particularly shown and described, it will be understood by one of ordinary skill in the art that variations in form and detail may be made therein without departing from the spirit and scope of the attached claims.

What is claimed is:

1. A display device, comprising:
    a display unit which displays an image in a bent state and comprising a plurality of display surfaces divided from each other by a bending position thereof;
    a bend-measuring unit comprising a sensor which measures a bending value of the display unit;
    a viewpoint-monitoring unit comprising a sensor which measures a viewing position of a viewer, wherein the viewpoint-monitoring unit outputs position information based on the measured viewing position of the viewer;
    a control unit which compensates image data to be displayed on each of the display surfaces, based on the bending value and a viewing angle; and
    a driving unit which drives the display unit using the compensated image data,
    wherein the control unit calculates the viewing angle between the viewing position of the viewer and a line normal to each of the display surfaces, based on the position information.

2. The display device of claim 1, wherein the control unit adjusts scales of an image to be displayed on the display surfaces with substantially a same scaling condition, when viewing angles of the display surfaces are substantially the same as each other.

3. The display device of claim 1, further comprising:
    a storing unit which stores a plurality of scaling weights.

4. The display device of claim 3, wherein the control unit selects a scaling weight for each of the display surfaces from the scaling weights of the storing unit based on the bending value of the display unit.

5. The display device of claim 3, wherein the bending value is determined based on a folding angle between two adjacent display surfaces of the display surfaces.

6. The display device of claim 5, wherein the control unit turns off the display unit, when the folding angle is smaller than a pre-set reference folding angle.

7. The display device of claim 1, wherein the control unit applies different scaling conditions to the image data to be displayed on each of the display surfaces, when viewing angles to the display surfaces are different from each other.

8. The display device of claim 7, wherein
the control unit performs a scaling with respect to a first display surface of the display surfaces based on a first weight, and performs a scaling with respect to a second display surface of the display surfaces based on a second weight, which is smaller than the first scaling weight, when the viewing angle of the second display surface is smaller the viewing angle of the first display surface.

9. The display device of claim 8, further comprising:
a storing unit which stores the scaling conditions corresponding to the viewing angles.

10. The display device of claim 7, wherein the control unit turns off a display surface of the display surfaces, when the viewing angle of the display surface is greater than a pre-set reference viewing angle.

11. The display device of claim 7, wherein the bending value is determined based on a folding angle between two adjacent display surfaces of the display surfaces.

12. The display device of claim 11, wherein the control unit turns off the display unit, when the folding angle is smaller than a pre-set reference folding angle.

13. A method of driving a display device, the method comprising:
measuring a bending value of a display unit of the display device, wherein the display unit displays an image in a bent state and comprises a plurality of display surfaces divided from each other by a bending position thereof;
measuring a viewing position of a viewer to obtain position information based on the viewing position;
compensating image data to be displayed on each of the display surfaces, based on the bending value and a viewing angle; and
driving the display unit using the compensated image data,
wherein the compensating the image data comprises calculating the viewing angle between the viewing position and a line normal to each of the display surfaces, based on the position information.

14. The method of claim 13, wherein the compensating the image data further comprises:
examining whether viewing angles of the display surfaces are substantially the same as each other; and
adjusting scales of images to be displayed on the display surfaces,
wherein the adjusting the scales of the images is
performed using substantially a same scaling condition, when the viewing angles are substantially the same as each other, and
performed using different scaling conditions, when the viewing angles are different from each other.

15. The method of claim 14, wherein
the adjusting the scales of the images is performed to apply scaling weights to the display surfaces, respectively, and
the scaling weights are determined based on the bending value.

16. The method of claim 15, wherein the bending value is determined based on a folding angle between two adjacent display surfaces of the display surfaces.

17. The method of claim 16, wherein the driving the display unit comprises turning off the display unit, when the folding angle is smaller than a pre-set reference folding angle.

18. The method of claim 14, wherein the driving the display unit comprises turning off a display surface of the display surfaces of the display unit, when the viewing angle of the display surface is greater than a pre-set reference viewing angle.

* * * * *